United States Patent
Matsui

(10) Patent No.: US 10,235,591 B2
(45) Date of Patent: Mar. 19, 2019

(54) IMAGE RECOGNITION UNIT, LEARNING METHOD OF THE SAME, AND ELECTRONIC APPARATUS

(71) Applicant: SONY SEMICONDUCTOR SOLUTIONS CORPORATION, Kanagawa (JP)

(72) Inventor: Yasuhiro Matsui, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 77 days.

(21) Appl. No.: 15/326,756

(22) PCT Filed: Jul. 1, 2015

(86) PCT No.: PCT/JP2015/068984
§ 371 (c)(1),
(2) Date: Jan. 17, 2017

(87) PCT Pub. No.: WO2016/021342
PCT Pub. Date: Feb. 11, 2016

(65) Prior Publication Data
US 2017/0213099 A1    Jul. 27, 2017

(30) Foreign Application Priority Data
Aug. 6, 2014 (JP) .................... 2014-160215

(51) Int. Cl.
*G06K 9/00* (2006.01)
*G06K 9/46* (2006.01)
*G06K 9/62* (2006.01)

(52) U.S. Cl.
CPC ....... *G06K 9/4604* (2013.01); *G06K 9/00973* (2013.01); *G06K 9/4652* (2013.01); *G06K 9/6257* (2013.01)

(58) Field of Classification Search
CPC combination set(s) only.
See application file for complete search history.

(56) References Cited

U.S. PATENT DOCUMENTS

| | | | |
|---|---|---|---|
| 2003/0156744 A1* | 8/2003 | Hashimoto | G06K 9/00013 382/124 |
| 2003/0185425 A1* | 10/2003 | Nishikawa | G06F 3/03547 382/124 |
| 2007/0165910 A1* | 7/2007 | Nagaoka | B60W 40/04 382/104 |

FOREIGN PATENT DOCUMENTS

| | | |
|---|---|---|
| JP | 2003-287707 A | 10/2003 |
| JP | 2012-048402 A | 3/2012 |

OTHER PUBLICATIONS

Viola, et al., "Robust Real-time Object Detection", Cambridge Research Laboratory, Feb. 2001, pp. 30.

(Continued)

*Primary Examiner* — Alex Kok S Liew
(74) *Attorney, Agent, or Firm* — Chip Law Group

(57) ABSTRACT

An image recognition unit of the present disclosure includes: a plurality of memory sections; a writing section that selectively writes a plurality of pieces of pixel data of a data map to the plurality of memory sections; and an arithmetic section that reads a plurality of pixel data sets from the plurality of memory sections, and determines whether an input image corresponding to the data map includes a recognition object, on a basis of the plurality of pixel data sets, the pixel data sets each including a predetermined number of pieces of pixel data.

16 Claims, 16 Drawing Sheets

(56) References Cited

OTHER PUBLICATIONS

Viola, et al., "Rapid Object Detection using a Boosted Cascade of Simple Features", IEEE, Proceedings of the computer Society Conference on Computer Vision and Pattern Recognition, vol. 1, Dec. 8-14, 2001, pp. 511-518.

Viola, et al., "Robust Real-time Object Detection", Feb. 2001, pp. 30.

Viola, et al., "Rapid Object Detection using a Boosted Cascade of Simple Features", Proceedings of the 2001 IEEE Computer Society Conference on Computer Vision and Pattern Recognition, Dec. 8-14, 2001, vol. 1, pp. 511-518.

\* cited by examiner

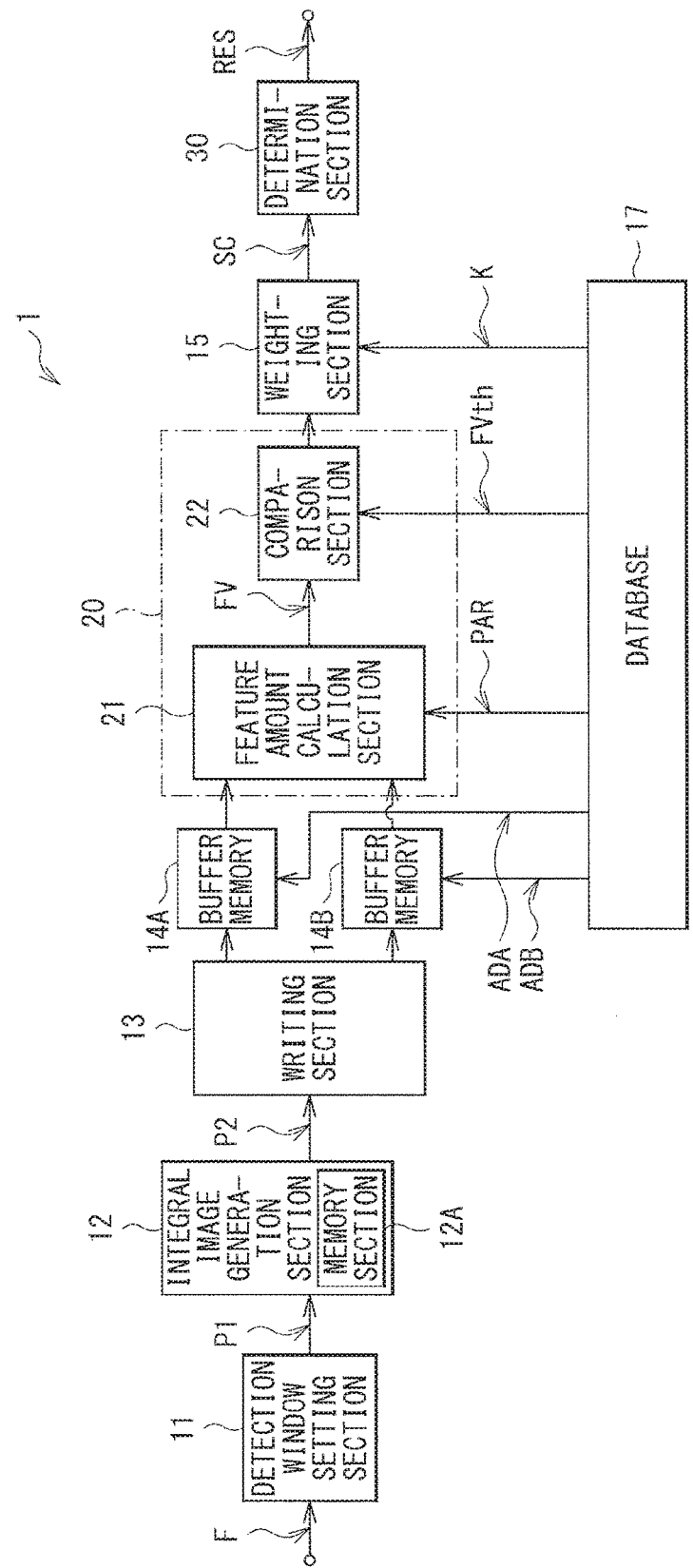
[FIG. 1]

[FIG. 2]
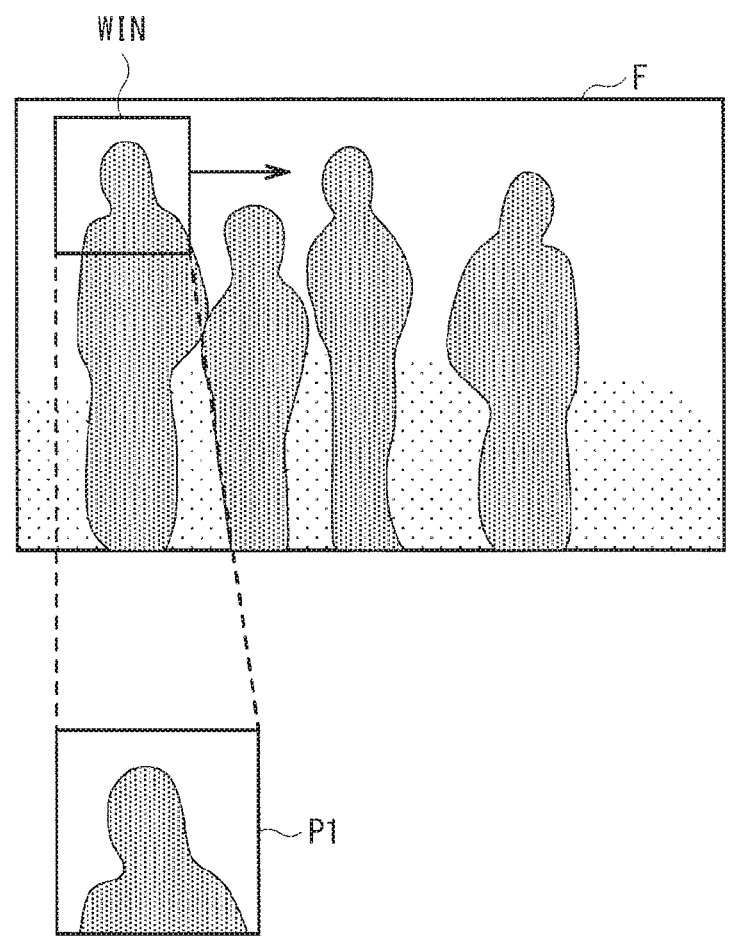

[ FIG. 3A ]
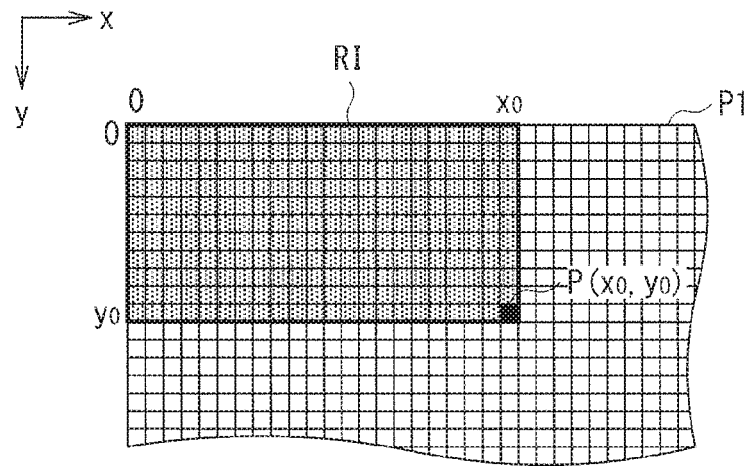
[ FIG. 3B ]
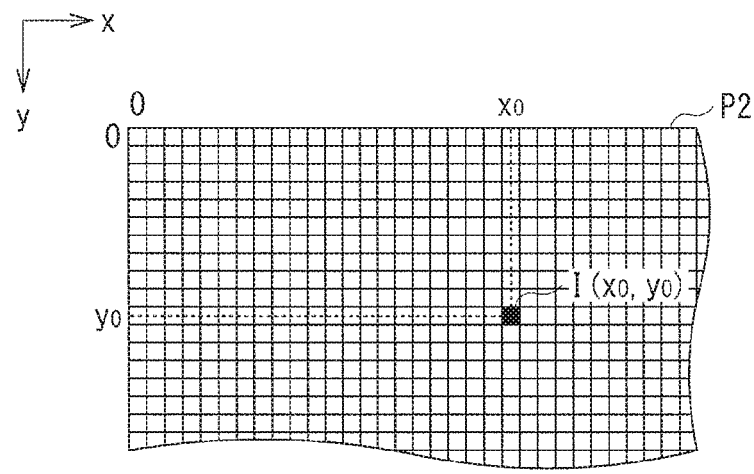

[ FIG. 4 ]
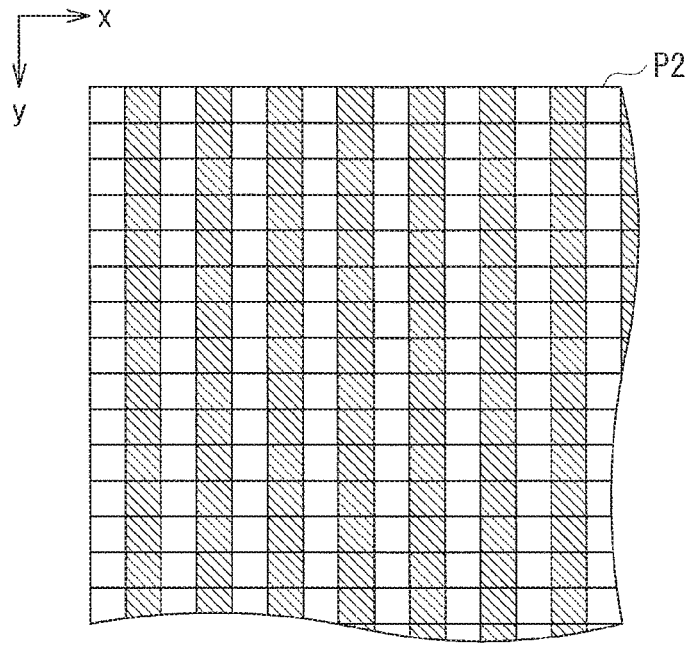
[ FIG. 5 ]
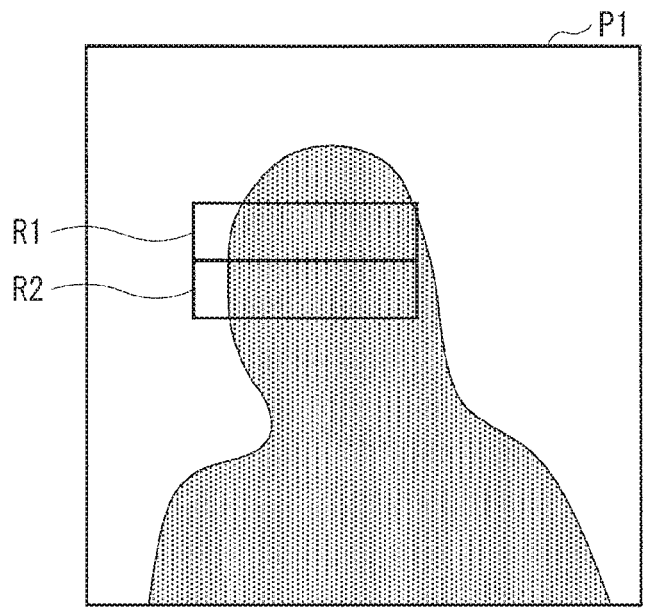

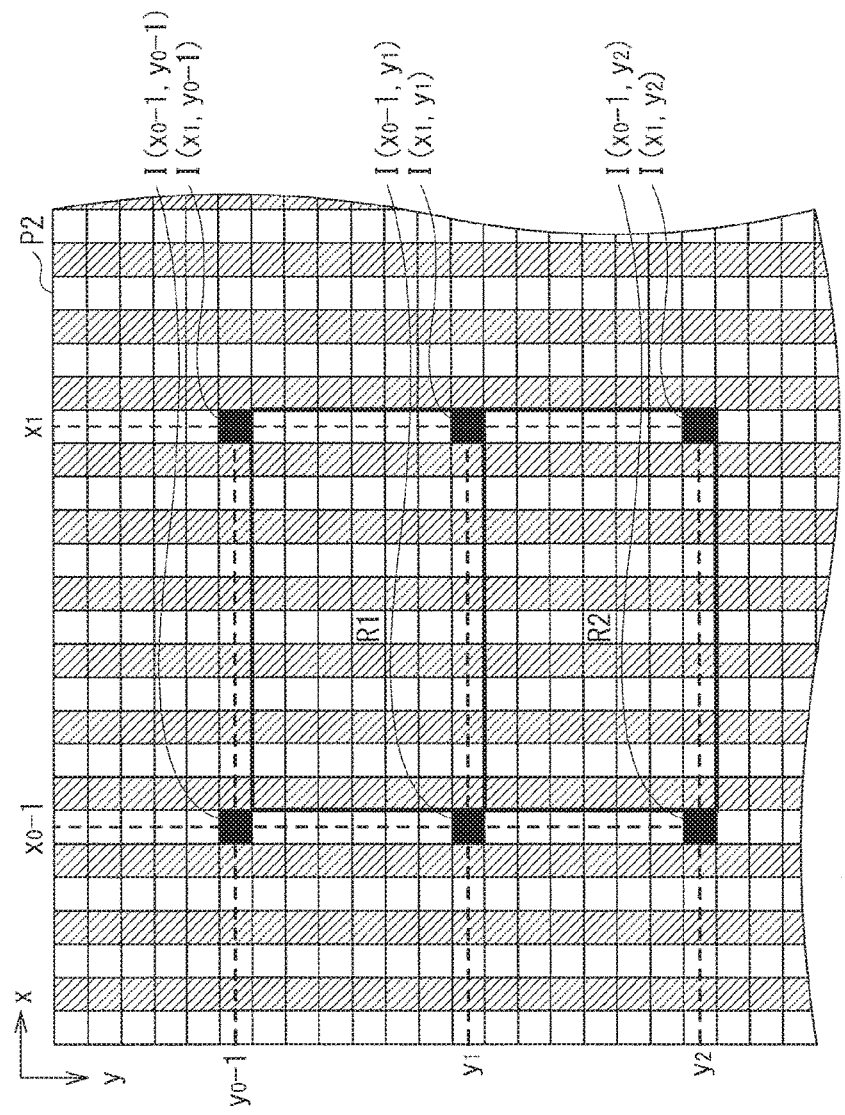
[FIG. 6]

[ FIG. 7A ]
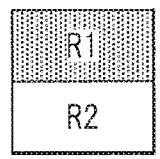
[ FIG. 7B ]
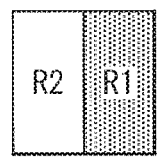
[ FIG. 7C ]
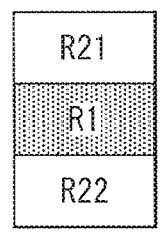
[ FIG. 7D ]
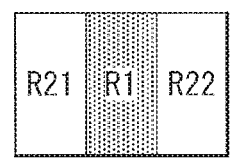
[ FIG. 7E ]
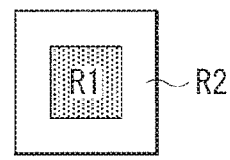

[ FIG. 8 ]
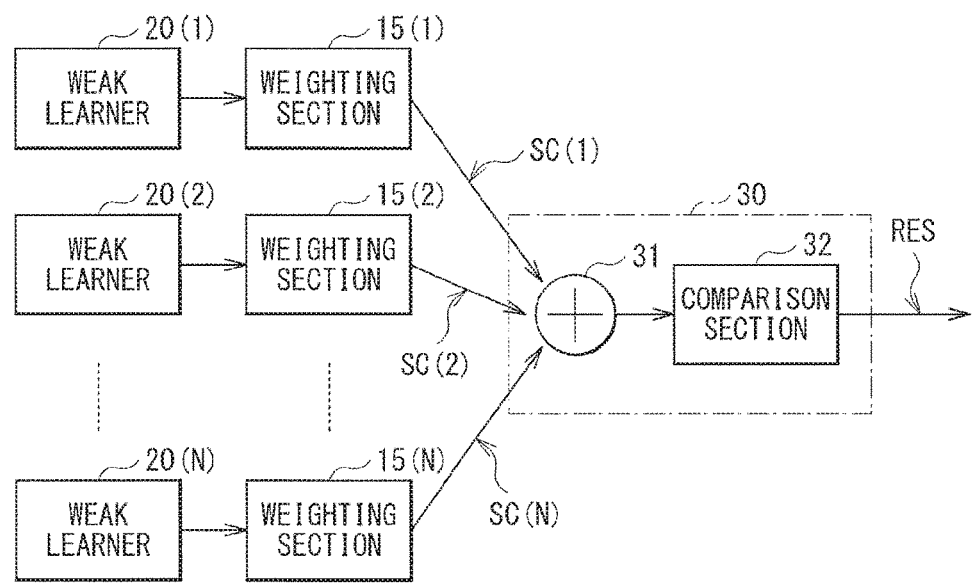

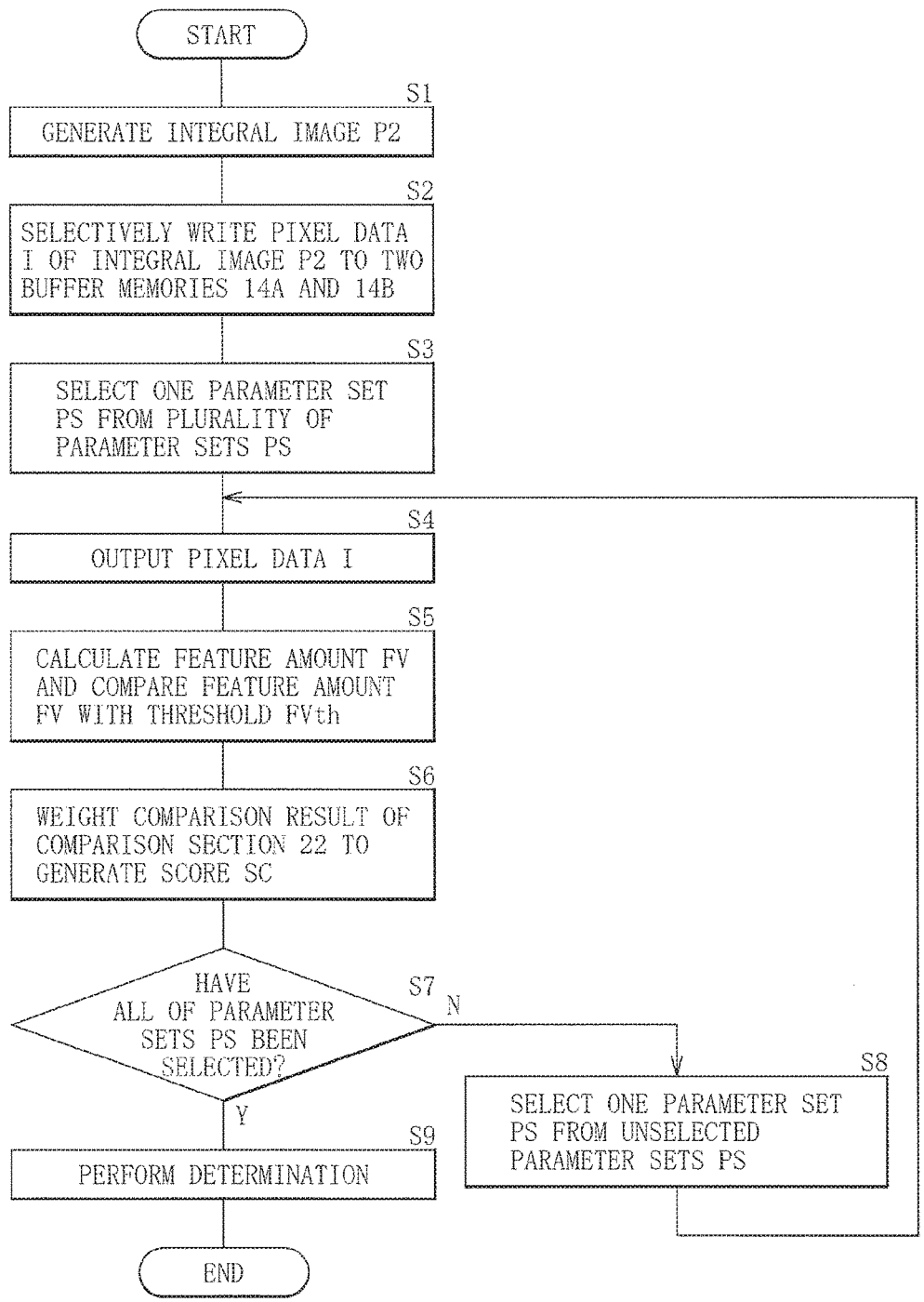

[ FIG. 10 ]
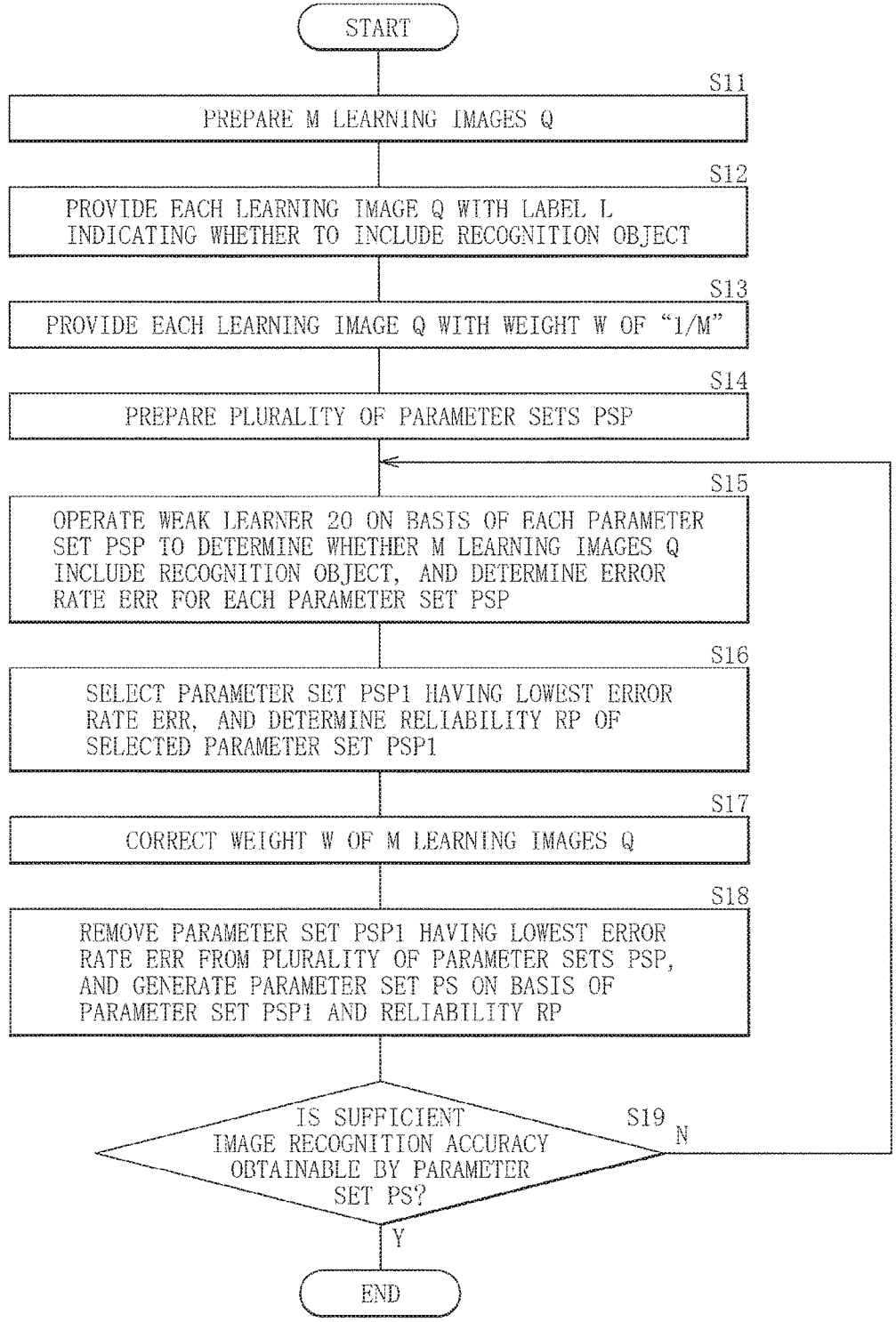

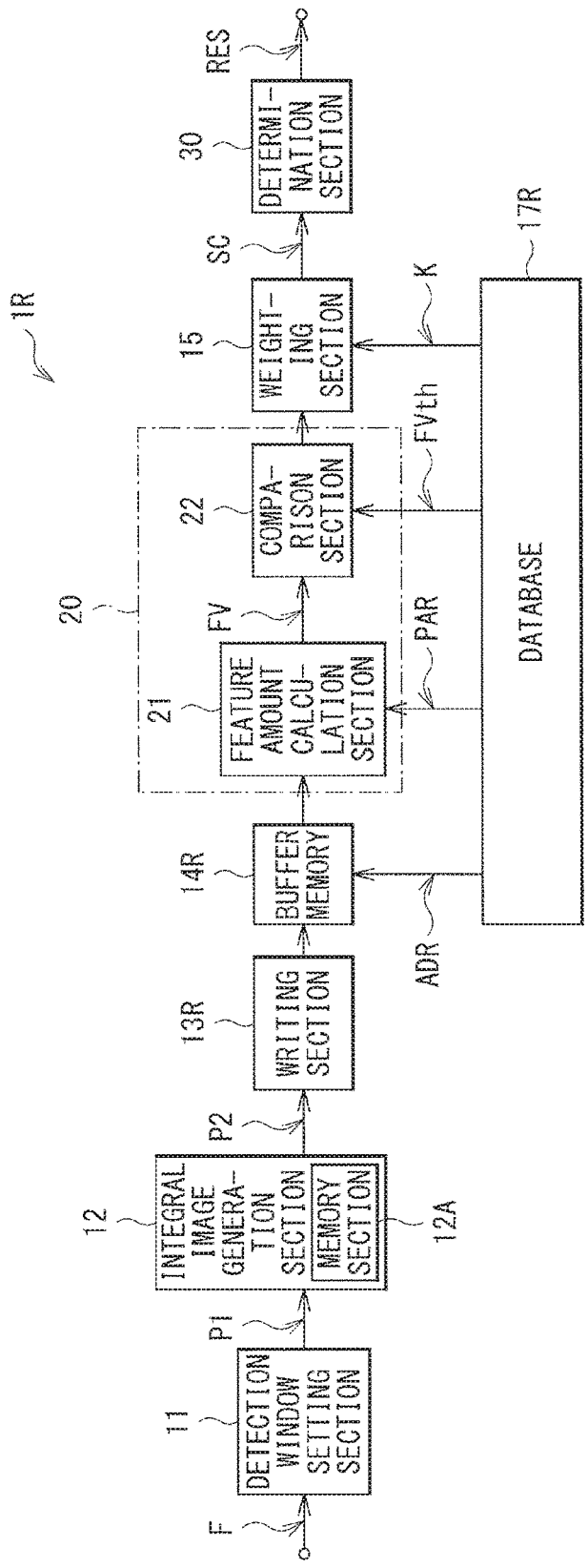
[FIG. 11]

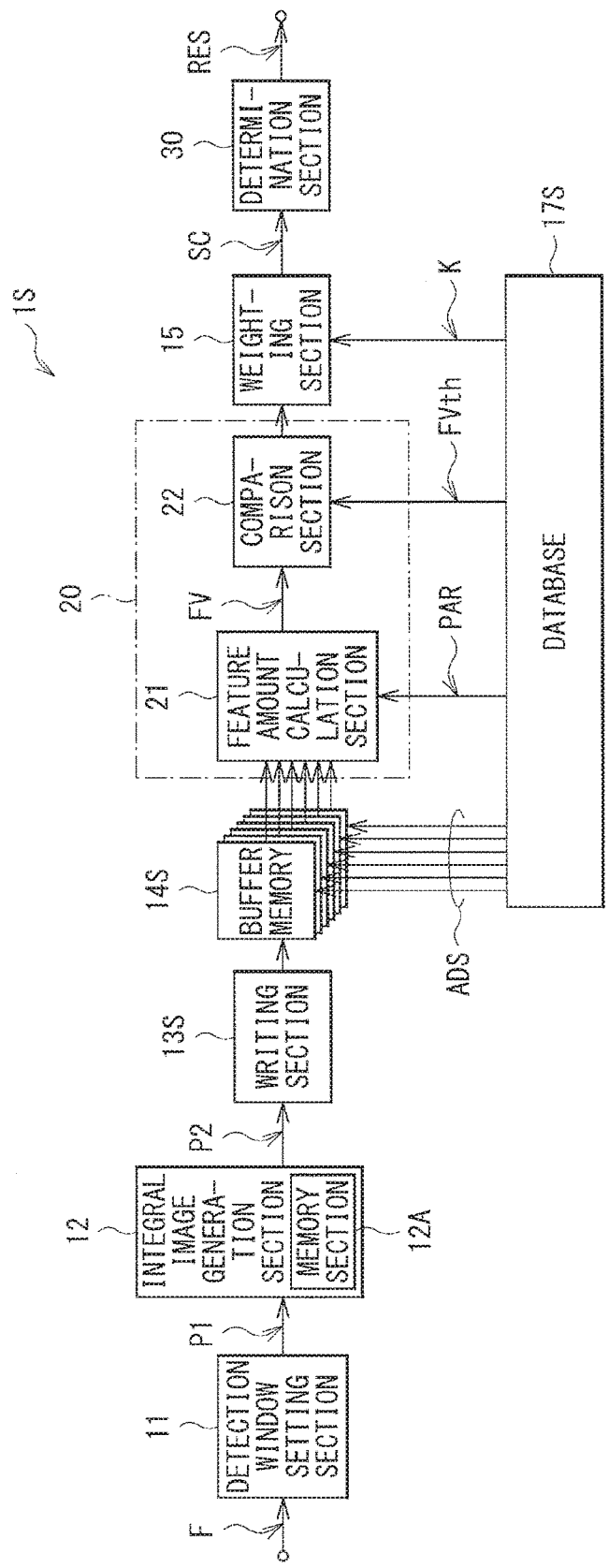
[FIG. 12]

[ FIG. 13 ]
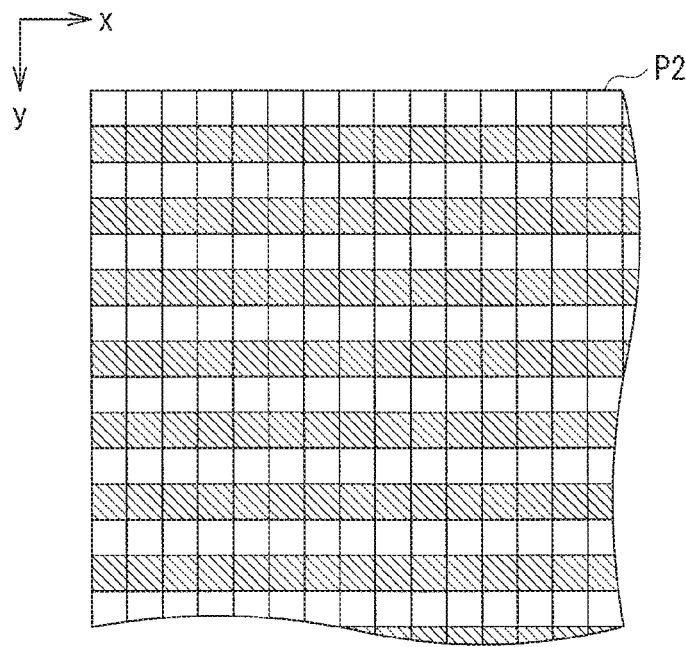
[ FIG. 14 ]
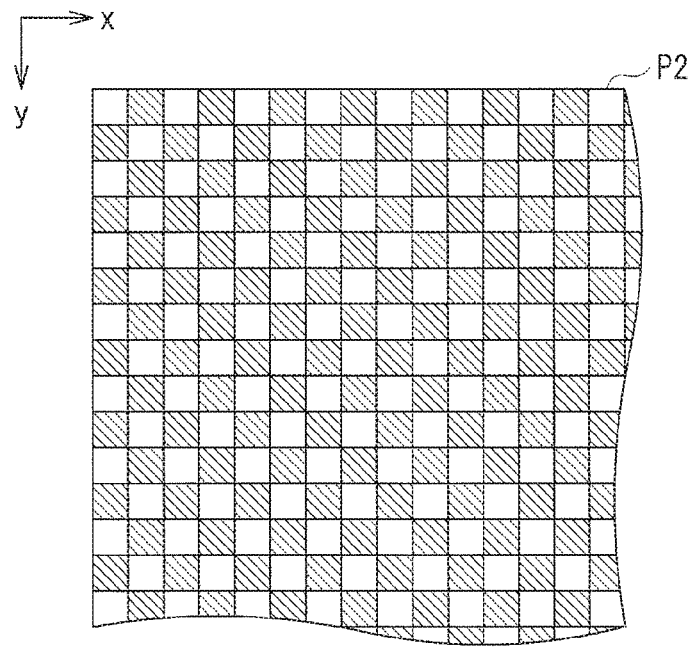

[ FIG. 15 ]
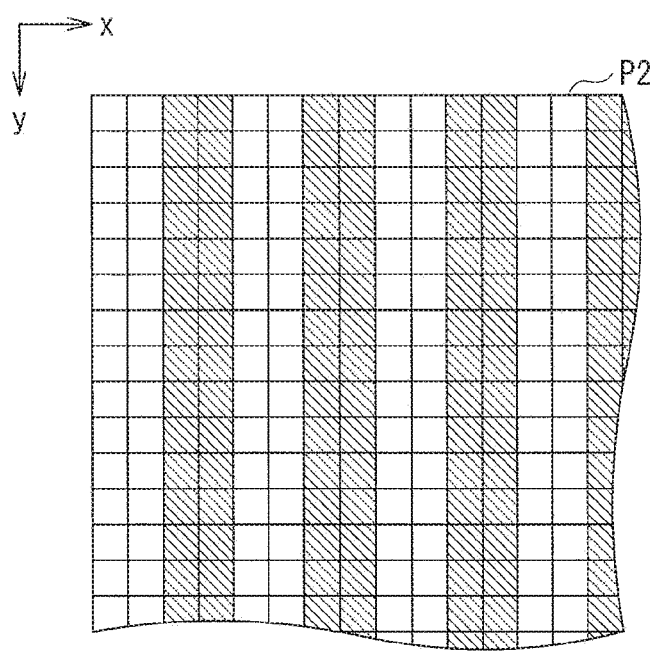

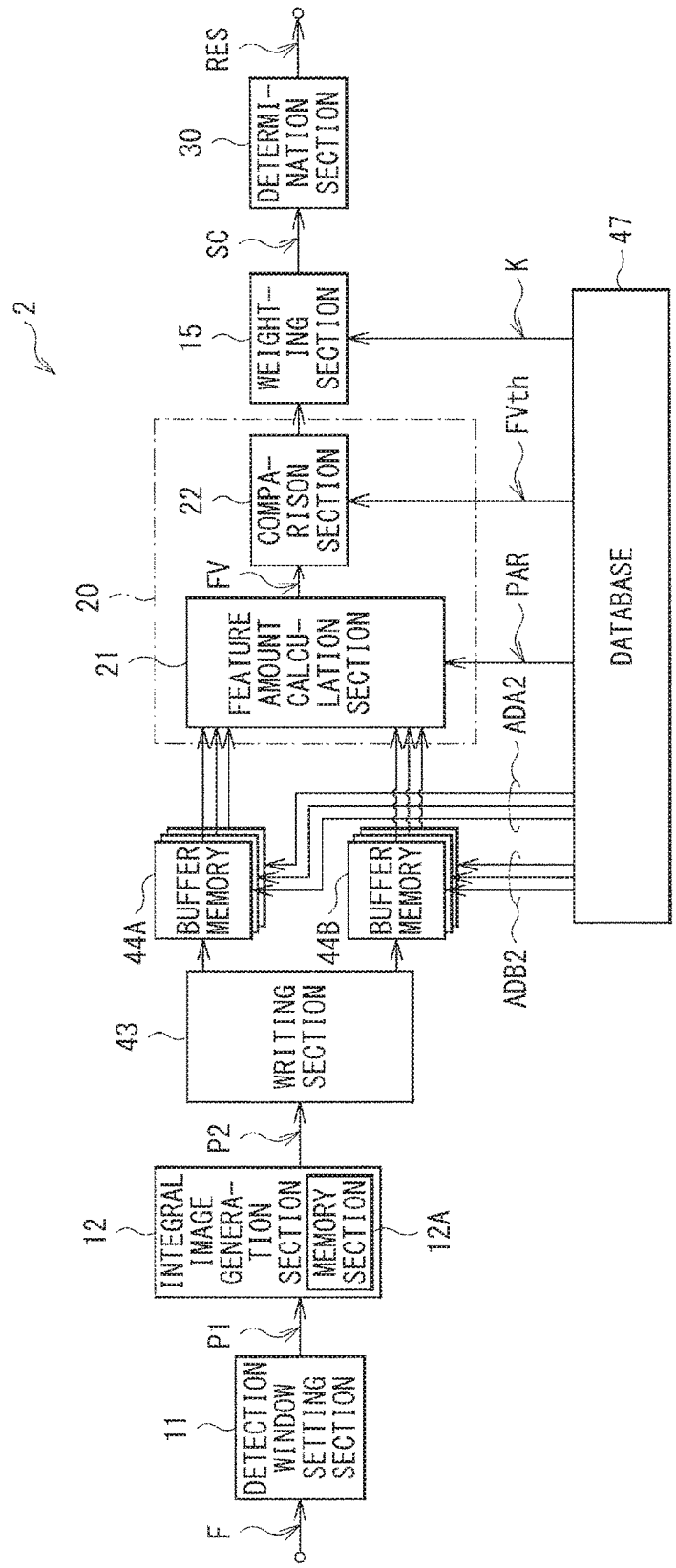

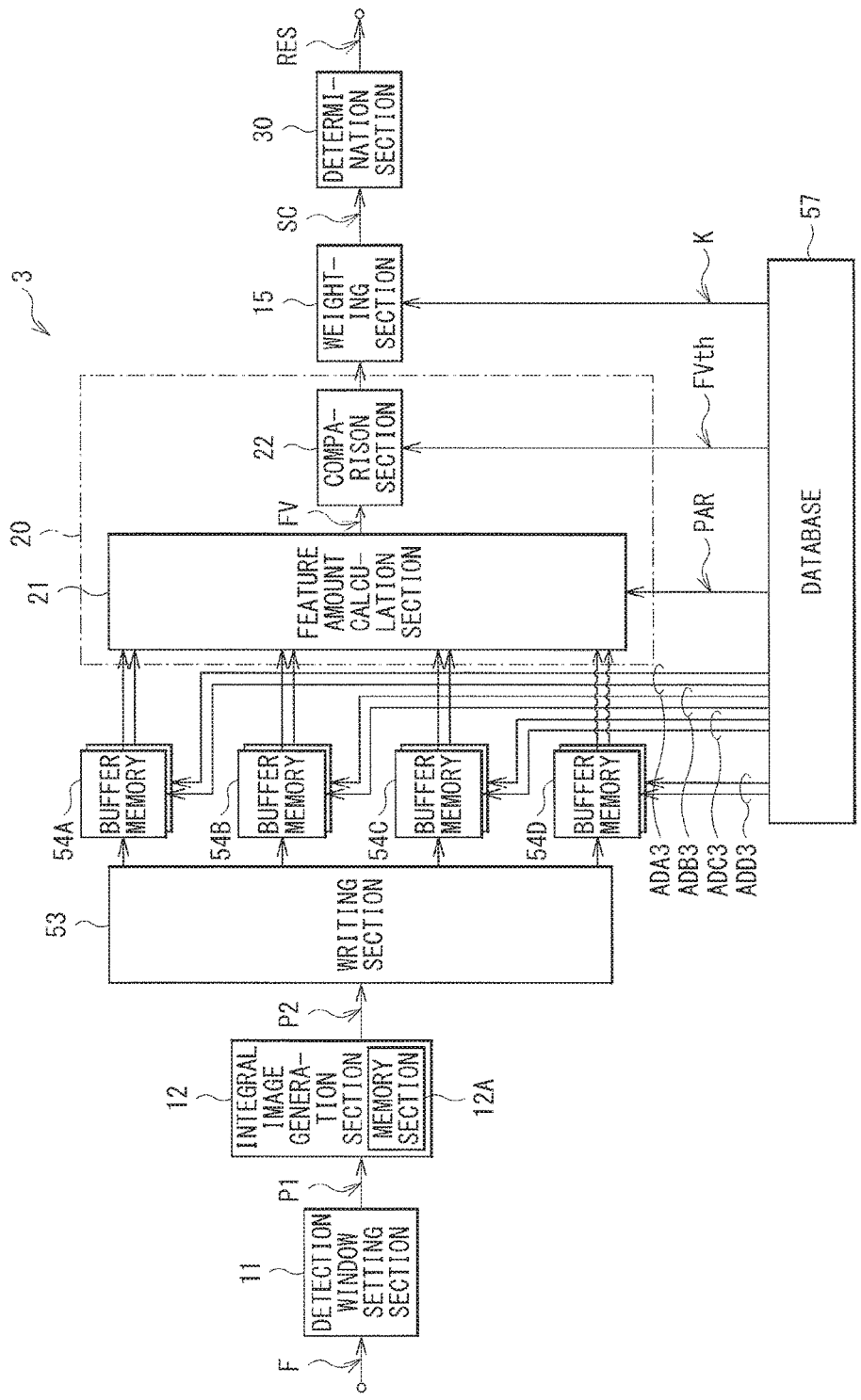
[FIG. 17]

[ FIG. 18 ]
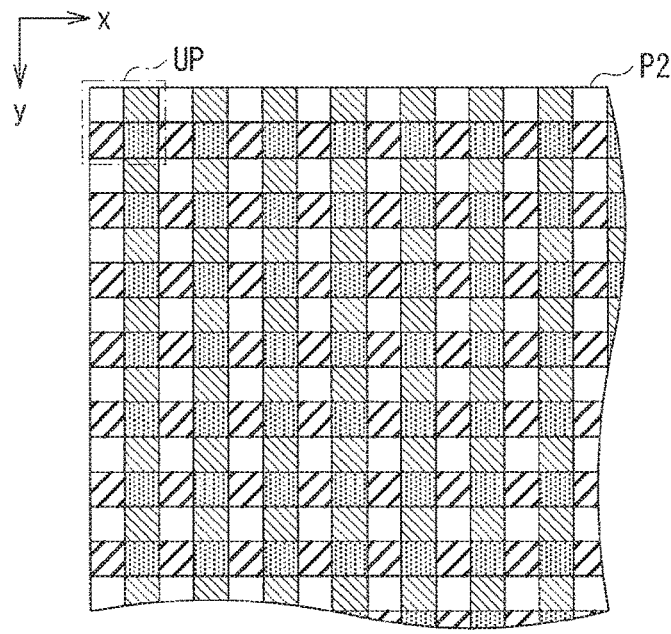
[ FIG. 19A ]
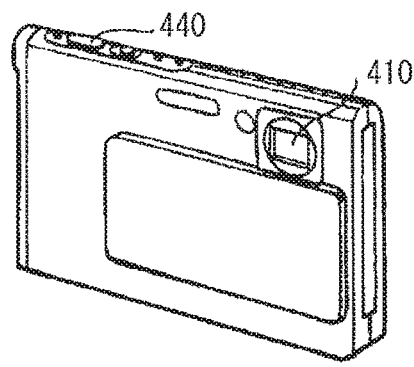
[ FIG. 19B ]
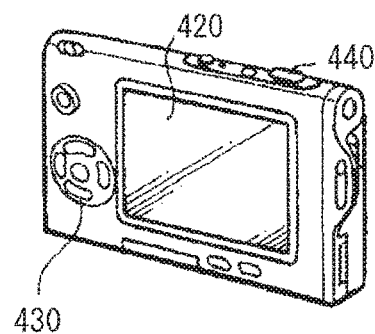

IMAGE RECOGNITION UNIT, LEARNING METHOD OF THE SAME, AND ELECTRONIC APPARATUS

CROSS REFERENCE TO RELATED APPLICATIONS

This application is a U.S. National Phase of International Patent Application No. PCT/JP2015/068984 filed on Jul. 1, 2015, which claims priority benefit of Japanese Patent Application No. JP 2014-160215 filed in the Japan Patent Office on Aug. 6, 2014. Each of the above-referenced applications is hereby incorporated herein by reference in its entirety.

TECHNICAL FIELD

The present disclosure relates to an image recognition unit that recognizes a predetermined image, a learning method of such an image recognition unit, and an electronic apparatus including such an image recognition unit.

BACKGROUND ART

In recent years, an imaging unit such as a camera is mounted on a lot of electronic apparatuses. Some of such electronic apparatuses include an image recognition function that determines whether an image to be picked up includes a recognition object (such as a human face).

Various technologies have been developed for the method of performing such image recognition. For example, NPTL1 discloses a method of performing image recognition with use of a plurality of weak learners. The weak learner is a simple learner with low accuracy that determines a total value of luminance values in 788854302541 a plurality of rectangular regions of an input image and determines a feature amount on the basis of the total value. In the image recognition method, using a plurality of such weak learners improves image recognition accuracy.

CITATION LIST

Non-Patent Literature

NPTL1: Paul Viola, Michael Jones, "Robust real-time object detection", Technical Report CRL 2001/01, Compaq Cambridge Research Laboratory, 2001.

SUMMARY OF INVENTION

The electronic apparatus is typically desired to perform processing in a short time, and improvement of a processing speed is expected for the image recognition unit.

Therefore, it is desirable to provide an image recognition unit, a learning method of the image recognition unit, and an electronic apparatus that make it possible to increase a processing speed.

An image recognition unit according to an embodiment of the disclosure includes a plurality of memory sections, a writing section, and an arithmetic section. The writing section selectively writes pixel data of a data map to the plurality of memory sections. The arithmetic section reads a plurality of pixel data sets each including a predetermined number of pieces of pixel data, from the plurality of memory sections, and determines whether an input image corresponding to the data map includes a recognition object, on the basis of the plurality of pixel data sets.

A learning method of an image recognition unit according to an embodiment of the disclosure includes: generating a data map including a plurality of pieces of pixel data, on a basis of a learning image; preparing a writing pattern that indicates association between each coordinate of the data map and a memory section writing the pixel data at the coordinate out of a plurality of memory sections; setting coordinates of a predetermined number of pieces of pixel data in the data map to prevent read access from concentrating on one memory section when the predetermined number of pieces of pixel data are read from the plurality of memory sections; acquiring the predetermined number of pieces of pixel data from the data map to determine whether the learning image includes a recognition object, on the basis of the acquired pixel data; and determining whether to use the coordinates of the predetermined number of pieces of pixel data for image recognition processing, on the basis of a determination result.

An electronic apparatus according to an embodiment of the disclosure includes the above-described image recognition unit, and examples of the electronic apparatus may include a digital camera, a television, a smartphone, and a game machine.

In the image recognition unit and the electronic apparatus according to the respective embodiments of the disclosure, the plurality of pixel data sets are read from the plurality of memory sections, and determination whether the input image includes the recognition object is performed on the basis of the plurality of pixel data sets. At this time, the pixel data of the data map are selectively written to the plurality of memory sections.

In the learning method of the image recognition unit according to the embodiment of the disclosure, the predetermined number of pieces of pixel data are acquired from the data map. The determination whether the learning image includes the recognition object is performed on the basis of the acquired pixel data. The determination whether to use the coordinates of the predetermined number of pieces of pixel data for image recognition processing is performed on the basis of the determination result. At this time, the coordinates of the predetermined number of pieces of pixel data in the data map are set to prevent the read access from concentrating on one memory section when the predetermined number of pieces of pixel data are read from the plurality of memory sections.

Since the image recognition unit and the electronic apparatus according to the respective embodiments of the disclosure selectively write the pixel data of the data map to the plurality of memory sections, it is possible to increase the processing speed.

Since the learning method of the image recognition unit according to the embodiment of the disclosure sets the coordinates of the predetermined number of pieces of pixel data of the data map to prevent the read access from focusing on one memory section, it is possible to increase the processing speed.

Note that effects described here are non-limiting. Effects achieved by the technology may be one or more of effects described in the present disclosure.

BRIEF DESCRIPTION OF DRAWINGS

FIG. 1 is a block diagram illustrating a configuration example of an image recognition unit according to an embodiment of the disclosure.

FIG. 2 is an explanatory diagram illustrating an operation example of a detection window setting section illustrated in FIG. 1.

FIG. 3A is an explanatory diagram illustrating an operation example of an integral image generation section illustrated in FIG. 1.

FIG. 3B is another explanatory diagram illustrating an operation example of the integral image generation section illustrated in FIG. 1.

FIG. 4 is an explanatory diagram illustrating an operation example of a writing section illustrated in FIG. 1.

FIG. 5 is an explanatory diagram illustrating an operation example of a feature amount calculation section illustrated in FIG. 1.

FIG. 6 is another explanatory diagram illustrating an operation example of the feature amount calculation section illustrated in FIG. 1.

FIG. 7A is an explanatory diagram illustrating an arrangement example of rectangular regions.

FIG. 7B is another explanatory diagram illustrating an arrangement example of the rectangular regions.

FIG. 7C is another explanatory diagram illustrating an arrangement example of the rectangular regions.

FIG. 7D is another explanatory diagram illustrating an arrangement example of the rectangular regions.

FIG. 7E is another explanatory diagram illustrating an arrangement example of the rectangular regions.

FIG. 8 is an explanatory diagram illustrating an operation example of a weak learner and a weighting section illustrated in FIG. 1.

FIG. 9 is a flowchart illustrating an operation example of the image recognition unit illustrated in FIG. 1.

FIG. 10 is a flowchart illustrating a learning process of the image recognition unit illustrated in FIG. 1.

FIG. 11 is a block diagram illustrating a configuration example of an image recognition unit according to a comparative example.

FIG. 12 is a block diagram illustrating a configuration example of an image recognition unit according to another comparative example.

FIG. 13 is an explanatory diagram illustrating an operation example of a writing section according to a modification.

FIG. 14 is an explanatory diagram illustrating an operation example of a writing section according to another modification.

FIG. 15 is an explanatory diagram illustrating an operation example of a writing section according to another modification.

FIG. 16 is a block diagram illustrating a configuration example of an image recognition unit according to another modification.

FIG. 17 is a block diagram illustrating a configuration example of an image recognition unit according to another modification.

FIG. 18 is an explanatory diagram illustrating an operation example of a writing section illustrated in FIG. 17.

FIG. 19A is a perspective view of an appearance configuration of a digital camera to which the image recognition unit according to the embodiment is applied.

FIG. 19B is another perspective view of the appearance configuration of the digital camera to which the image recognition unit according to the embodiment is applied.

MODES FOR CARRYING OUT THE INVENTION

Some embodiments of the disclosure are described in detail below with reference to drawings. Note that description is given in the following order.

1. Embodiment
2. Application example

1. Embodiment

Configuration Example

FIG. 1 is a diagram illustrating a configuration example of an image recognition unit according to an embodiment. In this example, an image recognition unit 1 recognizes a human face. Note that a learning method of an image recognition unit according to an embodiment of the disclosure is embodied by the present embodiment, and is therefore described together.

The image recognition unit 1 includes a detection window setting section 11, an integral image generation section 12, a writing section 13, buffer memories 14A and 14B, a weak learner 20, a weighting section 15, a database 17, and a determination section 30.

The detection window setting section 11 generates an image P1 to be subjected to image recognition processing, based on a frame image F. Each of the frame image F and the image P1 is configured of a plurality of pieces of arranged luminance data P.

FIG. 2 illustrates an operation example of the detection window setting section 11. The detection window setting section 11 sequentially sets a detection window WIN having a predetermined size while shifting the detection window WIN in the frame image F, and sequentially outputs the image in the detection window WIN as the image P1. This allows block sections subsequent to the detection window setting section 11 of the image recognition unit 1 to sequentially determine whether the image P1 includes a recognition object (a human face in this example).

The integral image generation section 12 generates an integral image P2 based on the image P1. The integral image P2 is configured of a plurality of pieces of arranged integral data I. The integral image generation section 12 includes a memory 12A. The memory 12A stores the generated integral image P2 and may be configured of, for example, a dynamic random access memory (DRAM).

FIGS. 3A and 3B each illustrate an operation example of the integral image generation section 12, where FIG. 3A illustrates an upper left part of the image P1, and FIG. 3B illustrates an upper left part of the integral image P2. The integral image generation section 12 integrates values of luminance data P of the image P1 with use of the following expression, thereby generating the integral data I of the integral image P2.

[Numerical Expression 1]

$$I(x_0, y_0) = \sum_{i=0}^{x_0} \sum_{j=0}^{y_0} P(i, j) \tag{1}$$

In other words, the integral image generation section 12 may add luminance data P in a rectangular region RI that has an x-coordinate equal to or lower than $x_0$ ($x \leq x_0$) and a y-coordinate equal to or lower than $y_0$ ($y \leq y_0$) in the image P1, to determine integral data $I(x_0, y_0)$ at coordinates ($x_0, y_0$) of the integral image P2. The integral image generation section 12 determines the integral data I at all of coordinates in the integral image P2 through such calculation. The integral image generation section 12 generates the integral image P2 based on the image P1 in this manner.

The writing section 13 writes the integral data I of the integral image P2 to the buffer memories 14A and 14B. At this time, the writing section 13 selectively writes the integral data I to the two buffer memories 14A and 14B with a predetermined writing pattern described below.

FIG. 4 illustrates an operation example of the writing section 13. The writing section 13 writes, out of the image data I of the integral image P2, the integral data I having an odd x-coordinate (a white part in FIG. 4) to the buffer memory 14A, and the integral data I having an even x-coordinate (a hatched part in FIG. 4) to the buffer memory 14B. As mentioned above, the writing section 13 selectively writes the integral data I to the two buffer memories 14A and 14B with the writing pattern as illustrated in FIG. 4 on the basis of the coordinates of the integral data I to be written.

The buffer memories 14A and 14B store the integral data I of the integral image P2. Each of the buffer memories 14A and 14B may be configured of, for example, a static random access memory (SRAM). The buffer memory 14A stores the integral data I having the odd x-coordinate out of the integral data I of the integral image P2, and the buffer memory 14B stores the integral data I having the even x-coordinate out of the integral data I of the integral image P2. In other words, a memory capacity of each of the buffer memories 14A and 14B corresponds to a half of the number of pieces of the integral data I of the integral image P2. Further, the buffer memory 14A outputs the integral data I at coordinates corresponding to a read address ADA that is supplied from the database 17 on the basis of the read address ADA. Likewise, the buffer memory 14B outputs the integral data I at coordinates corresponding to a read address ADB that is supplied from the database 17 on the basis of the read address ADB.

The weak learner 20 recognizes a feature of the recognition object (a human face in this example). The weak learner 20 includes a feature amount calculation section 21 and a comparison section 22.

The feature amount calculation section 21 calculates a feature amount FV on the basis of the integral data I supplied from the buffer memories 14A and 14B and a calculation parameter PAR. The calculation parameter PAR indicates a calculation method to calculate the feature amount FV with use of the integral data I, as described later.

FIG. 5 schematically illustrates an operation example of the feature amount calculation section 21. Note that, although the feature amount calculation section 21 calculates the feature amount FV with use of the integral data I of the integral image P2, the feature amount calculation section 21 is described with use of the image P1 for convenience of description in FIG. 5. In this example, the feature amount calculation section 21 subtracts a total value S1 of the luminance data P in a rectangular region R1 of the image P1 from a total value S2 of the luminance data P in a rectangular region R2, thereby calculating the feature amount FV. As described below, the feature amount calculation section 21 performs the calculation with use of six pieces of the integral data I of the integral image P2.

FIG. 6 illustrates an example of a calculation operation of the feature amount FV. In this example, the rectangular region R1 is a rectangular region that has an x-coordinate of $x_0$ or more and $x_1$ or less and a y-coordinate of $y_0$ or more and $y_1$ or less. Further, the rectangular region R2 is a rectangular region that has an x-coordinate of $x_0$ or more and $x_1$ or less and a y-coordinate of $(y_1+1)$ or more and $y_2$ or less. In addition, the value $(x_0-1)$ of the x-coordinate is an odd number and the value $x_1$ is an even number.

In this example, first, the buffer memory 14A outputs integral data $I(x_0-1, y_0-1)$, $I(x_0-1, y_1)$, and $I(x_0-1, y_2)$ on the bases of the read address ADA. The buffer memory 14B outputs the integral data $I(x_1, y_0-1)$, $I(x_1, y_1)$, and $I(x_1, y_2)$ on the basis of the read address ADB. Thereafter, the feature amount calculation section 21 calculates the feature amount FV based on these integral data I. Here, the total value S1 of the luminance data P in the rectangular region R1 is expressed by the following expression with use of four pieces of integral data $I(x_0-1, y_0-1)$, $I(x_0-1, y_1)$, $I(x_1, y_0-1)$, and $I(x_1, y_1)$.

[Numerical Expression 2]

$$S1 = \sum_{i=x_0}^{x_1} \sum_{j=y_0}^{y_1} P(i, j) \quad (2)$$
$$= I(x_1, y_1) - I(x_0-1, y_1) - I(x_1, y_0-1) + I(x_0-1, y_0-1)$$

Likewise, the total value S2 of the luminance data P in the rectangular region R2 is expressed by the following expression with use of four pieces of integral data $I(x_0-1, y_1)$, $I(x_0-1, y_2)$, $I(x_1, y_1)$, and $I(x_1, y_2)$.

[Numerical Expression 3]

$$S2 = \sum_{i=x_0}^{x_1} \sum_{j=y_1+1}^{y_2} P(i, j) \quad (3)$$
$$I(x_1, y_2) - I(x_0-1, y_2) - I(x_1, y_1) + I(x_0-1, y_1)$$

Accordingly, the feature amount FV is expressed by the following expression.

[Numerical Expression 4]

$$\begin{aligned}FV &= S2 - S1 \\ &= -I(x_0-1, y_0-1) + I(x_1, y_0-1) + 2I(x_0-1, y_1) - \\ &\quad 2I(x_1, y_1) - I(x_0-1, y_2) - I(x_1, y_2)\end{aligned} \quad (4)$$

The feature amount calculation section 21 calculates the feature amount FV based on six pieces of integral data $I(x_0-1, y_0-1)$, $I(x_0-1, y_1)$, $I(x_0-1, y_2)$, $I(x_1, y_0-1)$, $I(x_1, y_1)$, and $I(x_1, y_2)$, with use of the expression (4). At this time, the feature amount calculation section 21 acquires the expression (4) on the basis of the calculation parameter PAR supplied from the database 17, and substitutes the six pieces of integral data I into the expression (4), thereby calculating the feature amount FV.

As mentioned above, the image recognition unit 1 previously generates the integral image P2, and calculates the feature amount FV with use of the integral data I of the integral image P2, which allows for reduction of the number of read times of the data from the buffer memories 14A and 14B. In other words, for example, when the image P1 itself is stored in the buffer memory, it is necessary to read the luminance data P at all of coordinates in the rectangular regions R1 and R2 to calculate the feature amount FV, which increases the number of read times of the data. On the other hand, the image recognition unit 1 stores the integral image P2 in the buffer memories 14A and 14B, which allows for reduction of the number of read times of the data.

Further, in the image recognition unit 1 in this example, out of the six pieces of integral data I used in calculation of the feature amount FV, three pieces of integral data I each have an odd x-coordinate and the other three pieces of integral data I each have an even x-coordinate. This makes it possible to read three pieces of integral data I from each of the buffer memories 14A and 14B. The image recognition unit 1 makes it possible to reduce possibility of read access concentrating on one of the buffer memories 14A and 14B, which allows for reduction of the time necessary for reading of the integral data I.

Note that, the rectangular regions R1 and R2 are formed in a horizontally long shape and are disposed side by side in a vertical direction in this example; however, the shapes and the arrangement of the rectangular regions R1 and R2 are not limited thereto. In addition to the example (FIG. 7A), the rectangular regions R1 and R2 may be formed in a vertically long shape and may be disposed side by side in a horizontal direction, for example, as illustrated in FIG. 7B. Further, as illustrated in FIGS. 7C and 7D, three rectangular regions R1, R21, and R22 may be provided. In the example of FIG. 7C, the three rectangular regions R21, R1 and R22 are formed in a horizontally long shape and are disposed side by side in this order in the vertical direction. In the example of FIG. 7D, the three rectangular regions R21, R1 and R22 are formed in a vertically long shape and are disposed side by side in this order in the horizontal direction. In the examples of FIGS. 7C and 7D, for example, the feature amount calculation section 21 may subtract the total value of the luminance data P in the rectangular region R1 in the image P1 from a total value of luminance data P in the rectangular regions R21 and R22, thereby calculating the feature amount FV. Moreover, as illustrated in FIG. 7E, the rectangular region R1 may be surrounded by the rectangular region R2. Note that the rectangular regions are not limited thereto, and a plurality of rectangular regions may be used in various layouts.

The comparison section 22 compares the feature amount FV with a threshold FVth that is supplied from the database 17. Then, when the feature amount FV is larger than the threshold FVth, the comparison section 22 outputs "1", and when the feature amount FV is equal to or smaller than the threshold FVth, the comparison section 22 outputs "0".

The weighting section 15 weights the comparison result of the comparison section 22 to generate a score SC. More specifically, the weighting section 15 multiplies the comparison result ("1" or "0") by a coefficient K that is supplied from the database 17, to determine the score SC.

The database 17 stores a plurality of parameter sets PS each including the read addresses ADA and ADB, the calculation parameter PAR, the threshold FVth, and the coefficient K. The parameter sets PS are determined in the learning process of the image recognition and stored in the database 17, as described later.

The buffer memories 14A and 14B, the weak learner 20, and the weighting section 15 each perform processing on each of the plurality of parameter sets PS. More specifically, for example, the database 17 may select one parameter set PS from the plurality of parameter sets PS, supply the read addresses ADA and ADB included in the selected parameter set PS respectively to the buffer memories 14A and 14B, supply the calculation parameter PAR and the threshold FVth to the weak learner 20, and supply the coefficient K to the weighting section 15. Then, the buffer memories 14A and 14B, the weak learner 20, and the weighting section 15 each perform processing, on the basis of the selected parameter set PS. Thereafter, the database 17 selects a next parameter set PS, and the buffer memories 14A and 14B, the weak learner 20, and the weighting section 15 each perform processing, on the basis of the selected parameter set PS.

FIG. 8 schematically illustrates operation of the weak learner 20 and the weighting section 15. In this example, the database 17 stores N parameter sets PS(1) to PS(N). The weak learner 20 and the weighting section 15 respectively function as weak learners 20(1) to 20(N) and weighting sections 15(1) to 15(N) in accordance with the parameter sets PS(1) to PS(N) to be used. The weak learner 20(1) and the weighting section 15(1) determine a score SC(1) based on the parameter set PS(1). The weak learner 20(2) and the weighting section 15(2) determine a score SC(2) based on the parameter set PS(2). The weak learners 20(3) to 20(N) and the weighting sections 15(3) to 15(N) determine a corresponding score in a similar manner. Then, the weighting section 15 supplies the N scores SC(1) to SC(N) to the determination section 30.

As mentioned above, the weak learners 20(1) to 20(N) operate on the basis of the parameter sets PS different from one another. In other words, for example, the weak learners 20(1) to 20(N) may set the plurality of rectangular regions as illustrated in FIGS. 7A to 7E at positions different from one another in the integral image P2. More specifically, for example, the weak learner 20(1) may set the rectangular regions R1 and R2 as illustrated in FIG. 7A at an upper left of the integral image P2 to acquire the feature amount FV. For example, the weak learner 20(2) may set the rectangular regions R1, R21, and R22 as illustrated in FIG. 7D at a center of the integral image P2 to acquire the feature amount FV. The image recognition unit 1 uses the plurality of parameter sets PS as mentioned above, to recognize the recognition object with high accuracy.

In other words, each of the parameter sets PS reflects a feature of the recognition object (a human face in this example). For example, in a case of the image P1 with a human face, eye and eyebrow parts may be low in a value of luminance data as compared with parts around the eye and eyebrow parts. Moreover, for example, a hair part may have a value of luminance data lower than that of a forehead part. The weak learner 20 confirms such features of the human face one by one, on the basis of the plurality of parameter sets PS. In other words, for example, the read addresses ADA and ADB included in the parameter set PS may correspond to positions of parts such as eyes and a forehead, and the weak learner 20 may confirm the feature of the human face, on the basis of the integral data I at the read addresses ADA and ADB.

The determination section 30 determines whether the image P1 includes the recognition object, on the basis of the plurality of scores SC. As illustrated in FIG. 8, the determination section 30 includes an adder 31 and a comparison section 32. The adder 31 adds the plurality of (N in this example) scores SC supplied from the weighting section 15. The comparison section 32 compares the addition result of the adder 31 with a predetermined threshold. When the addition result of the adder 31 is larger than the threshold, the comparison section 32 determines that the image P1 includes the recognition object, and when the addition result of the adder 31 is equal to or lower than the threshold, the comparison section 32 determines that the image P1 does not include the recognition object. Then, the comparison section 32 outputs the determination result as a determination result RES.

Here, the buffer memories 14A and 14B correspond to a specific example of a "plurality of memory sections" in the disclosure. The weak learner 20, the weighting section 15, the database 17, and the determination section 30 correspond to a specific example of an "arithmetic section" in the disclosure. The integral image generation section 12 corresponds to a specific example of a "data map generation section" in the disclosure. The detection window setting section 11 corresponds to a specific example of an "input image generation section" in the disclosure. The integral data I corresponds to a specific example of "pixel data" in the disclosure. The image P1 corresponds to a specific example of an "input image" in the disclosure. The integral image P2 corresponds to a specific example of a "data map" in the disclosure.

[Operation and Action]

Subsequently, operation and action of the image recognition unit 1 according to the present embodiment are described.

[General Operation Outline]

First, with reference to FIG. 1 and other drawings, general operation outline of the image recognition unit 1 is described. The detection window setting section 11 generates the image P1 to be subjected to the image recognition processing, based on the frame image F. The integral image generation section 12 generates the integral image P2 based on the image P1. The writing section 13 selectively writes the integral data I of the integral image P2 to the two buffer memories 14A and 14B. The buffer memory 14A stores the integral data I having an odd x-coordinate out of the integral data I of the integral image P2, and outputs the integral data I at the coordinates corresponding to the read address ADA that is supplied from the database 17 on the basis of the read address ADA. The buffer memory 14B stores the integral data I having an even x-coordinate out of the integral data I of the integral image P2, and outputs the integral data I at the coordinates corresponding to the read address ADB that is supplied from the database 17 on the basis of the read address ADB. The feature amount calculation section 21 calculates the feature amount FV based on the integral data I supplied from the buffer memories 14A and 14B and the calculation parameter PAR. The comparison section 22 compares the feature amount FV with the threshold FVth. The weighting section 15 weights the comparison result of the comparison section 22 with use of the coefficient K, thereby generating the score SC. The database 17 stores the plurality of parameter sets PS each including the read addresses ADA and ADB, the calculation parameter PAR, the threshold FVth, and the coefficient K. The determination section 30 determines whether the image P1 includes the recognition object, on the basis of the plurality of scores SC.

[Detailed Operation]

In the image recognition unit 1, the detection window setting section 11 sequentially sets the detection window WIN having a predetermined size in the frame image F, and sequentially generates the image P1. Thereafter, the block sections subsequent to the detection window setting section 11 determine whether each image P1 includes the recognition object (a human face in this example). The image recognition operation with respect to the image P1 is described in detail below.

FIG. 9 illustrates the image recognition operation with respect to the image P1. The image recognition unit 1 generates the integral image P2 based on the image P1, and determines the feature amount FV based on the integral image P2 multiple times, thereby determining whether the image P1 includes the recognition object. The operation is described in detail below.

First, the integral image generation section 12 generates the integral image P2 based on the image P1 (step S1). More specifically, the integral image generation section 12 may determine the integral data I with use of, for example, the expression (1), thereby generating the integral image P2.

Next, the writing section 13 selectively writes the integral data I of the integral image P2 to the two buffer memories 14A and 14B (step S2). More specifically, the writing section 13 writes, out of the integral data I of the integral image P2, the integral data I having an odd x-coordinate to the buffer memory 14A, and the integral data I having an even x-coordinate to the buffer memory 14B, in this example.

Next, the database 17 selects one parameter set PS from the plurality of parameter sets PS (step S3). Thereafter, the database 17 supplies the read addresses ADA and ADB included in the selected parameter set PS respectively to the buffer memories 14A and 14B, supplies the calculation parameter PAR to the feature amount calculation section 21, supplies the threshold FVth to the comparison section 22, and supplies the coefficient K to the weighting section 15.

Next, the buffer memories 14A and 14B output the integral data I (step S4). More specifically, the buffer memory 14A outputs the integral data I at the coordinates corresponding to the read address ADA that is supplied from the database 17 on the basis of the read address ADA. Likewise, the buffer memory 14B outputs the integral data I at the coordinates corresponding to the read address ADB that is supplied from the database 17 on the basis of the read address ADB. More specifically, for example, in the example of FIG. 6, the buffer memory 14A may output the integral data $I(x_0-1, y_0-1)$, $I(x_0-1, y_1)$, and $I(x_0-1, y_2)$ on the basis of the read address data ADA. The buffer memory 14B may output the integral data $I(x_1, y_0-1)$, $I(x_1, y_1)$, and $I(x_1, y_2)$ on the basis of the read address data ADB.

Next, the weak learner 20 calculates the feature amount FV, and compares the feature amount FV with the threshold FVth (step S5). More specifically, the feature amount calculation section 21 calculates the feature amount FV based on the plurality of pieces of integral data I supplied from the buffer memories 14A and 14B and the calculation parameter PAR. Thereafter, when the feature amount FV is larger than the threshold FVth, the comparison section 22 outputs "1", and when the feature amount FV is equal to or lower than the threshold FVth, the comparison section 22 outputs "0".

Next, the weighting section 15 weights the comparison result of the comparison section 22 to generate the score SC (step S6). More specifically, the weighting section 15 multiplies the comparison result ("1" or "0") of the comparison section 22 by the coefficient K supplied from the database 17, to determine the score SC.

Next, the database 17 confirms whether all of the parameter sets PS have been selected (step S7). When all of the parameter sets PS have not been selected ("N" in step S7), the database 17 selects one parameter set PS from the parameter sets PS that have not been selected yet (step S8). Thereafter, the database 17 supplies the read addresses ADA and ADB included in the selected parameter set PS respectively to the buffer memories 14A and 14B, supplies the calculation parameter PAR to the feature amount calculation section 21, supplies the threshold FVth to the comparison section 22, and supplies the coefficient K to the weighting section 15. Thereafter, the flow returns to step S4. Steps S4 to S8 are repeated until all of the parameter sets PS are selected. This causes the determination section 30 to acquire the plurality of scores SC corresponding to the plurality of parameter sets PS.

In step S7, when all of the parameter sets PS have been selected ("Y" in step S7), the determination section 30 determines whether the image P1 includes the recognition object, on the basis of the plurality of scores SC (step S9). More specifically, the adder 31 adds the plurality of scores SC supplied from the weighting section 15, and the comparison section 32 compares the addition result of the adder 31 with the predetermined threshold. When the addition result of the adder 31 is larger than the threshold, the comparison section 32 determines that the image P1 includes the recognition object, and when the addition result of the adder 31 is equal to or lower than the threshold, the comparison section 32 determines that the image P1 does not include the recognition object. Thereafter, the comparison section 32 outputs the determination result as the determination result RES.

As mentioned above, the image recognition unit 1 selectively writes the integral data I of the integral image P2 to the two buffer memories 14A and 14B, which makes it possible to increase the processing speed. In other words, in this example, the image recognition unit 1 first writes, out of the integral data I of the integral image P2, the integral data I having an odd x-coordinate to the buffer memory 14A, and the integral data I having an even x-coordinate to the buffer memory 14B. Further, for example, in the example of FIG. 6, out of the six pieces of integral data I used in calculation of the feature amount FV, three pieces of integral data I each have an odd x-coordinate and the other three pieces of integral data I each have an even x-coordinate. This makes it possible to read three pieces of integral data I from each of the buffer memories 14A and 14B. As mentioned above, the image recognition unit 1 makes it possible to reduce possibility of read access concentrating on one of the buffer memories 14A and 14B, which allows for reduction of a time necessary for reading of the integral data I. As a result, it is possible to increase the processing speed of the image recognition unit 1.

[Learning Method of Image Recognition]

The plurality of parameter sets PS used in the image recognition unit 1 are prepared through the learning process of the image recognition and are stored in the database 17. The learning method of the image recognition of the image recognition unit 1 is described below.

FIG. 10 illustrates an example of the learning method of the image recognition. Note that the learning method is not limited to this method, and various methods may be adopted.

First, M learning images Q are prepared (step S11). In this case, the M learning images Q include both a plurality of learning images Q each including the recognition object and a plurality of learning images Q each not including the recognition object.

Thereafter, a label L that indicates whether to include the recognition object is provided to each of the learning images Q (step S12). More specifically, the label L that indicates "including" is provided to each of the plurality of learning images Q each including the recognition object. The label L that indicates "not including" is provided to each of the plurality of learning images Q each not including the recognition object.

Thereafter, a weight W of "1/M" is provided to each of the learning images Q (step S13). Note that the weight W is updated every time the learning progresses. In other words, "1/M" is an initial value of the weight W.

Thereafter, a plurality of parameter sets PSP are prepared (step S14). The plurality of parameter sets PSP is a population for selection of the parameter set PS to be used in the image recognition operation. In other words, as described below, the parameter set PS to be used is sequentially selected from the plurality of parameter sets PSP in the learning process of the image recognition. Each of the parameter sets PSP includes the read addresses ADA and ADB, the calculation parameter PAR, and the threshold FVth. In the plurality of parameter sets PSP, the read addresses ADA and ADB, the calculation parameter PAR, and the threshold FVth are set to be different from one another among the parameter sets PS. In other words, the weak learner 20 that operates on the basis of each parameter set PSP sets the plurality of rectangular regions as illustrated in FIGS. 7A to 7E to positions different from one another in the integral image P2. At this time, the read addresses ADA and ADB are so set as to prevent the read access from concentrating on one of the buffer memories 14A and 14B.

Thereafter, the weak learner 20 is operated on the basis of each parameter set PSP, to determine whether each of the M learning images Q includes the recognition object, thereby determining an error rate ERR for each parameter set PSP (step S15). In this case, the error rate ERR indicates a sum of the weights W of the learning images Q, the label L ("including" or "not including") of which is not coincident with the determination result ("including" or "not including") of the weak learner 20. In other words, the error rate ERR indicates the sum of the weights W of the learning images Q that have not been accurately determined by the weak learner 20.

Thereafter, a parameter set PSP1 having the lowest error rate ERR is selected from the plurality of parameter sets PSP, and reliability RP of the parameter set PSP1 is determined (step S16). The high value of the reliability RP indicates high reliability.

Thereafter, the weight W of the learning image Q is corrected (step S17). More specifically, the weight W of the learning image, the label L of which is not coincident with the determination result of the weak learner 20 that has been operated on the basis of the parameter set PSP1 having the lowest error rate ERR, is increased, and the weight W of the learning image, the label L of which is coincident with the determination result of the weak learner 20, is decreased.

Thereafter, the parameter set PSP1 having the lowest error rate ERR is removed from the plurality of parameter sets PSP, and the parameter set PS to be used in the image recognition operation is generated on the basis of the parameter set PSP1 and the reliability RP (step S18). More specifically, the reliability RP determined in step S16 is set to the coefficient K, and the read addresses ADA and ADB, the calculation parameter PAR, and the threshold FVth of the parameter set PSP1 are combined thereto, to generate the parameter set PS.

Thereafter, it is verified whether sufficient image recognition accuracy is obtainable by the generated parameter set PS (step S19). When the image recognition accuracy is insufficient ("N" in step S19), the flow returns to step S15. Then, steps S15 to S19 are repeated until the image recognition accuracy becomes sufficient. This sequentially generates the plurality of parameter sets PS to be used in the image recognition operation.

When the image recognition accuracy is sufficient in step S19 ("Y" in step S19), the learning of the image recognition is terminated.

As mentioned above, the image recognition unit 1 so sets the read addresses ADA and ADB as to prevent the read access from concentrating on one of the buffer memories 14A and 14B at the time when the plurality of parameter sets PSP are prepared. This makes it possible to increase the processing speed. In other words, for example, in the example of FIG. 6, the image recognition unit 1 sets the read addresses ADA and ADB such that out of the six pieces of integral data I used in calculation of the feature amount FV, three pieces of integral data I each have an odd x-coordinate and the other three pieces of integral data I each have an even x-coordinate. This makes it possible to read three pieces of integral data I from each of the buffer memories 14A and 14B and to increase the processing speed accordingly.

Next, the action of the present embodiment is described with comparison with some comparative examples.

Comparative Example 1

FIG. 11 illustrates a configuration example of an image recognition unit 1R according to a comparative example 1. The image recognition unit 1R includes a writing section 13R, a buffer memory 14R, and a database 17R. The writing section 13R writes the integral data I of the integral image P2 to the buffer memory 14R. The buffer memory 14R stores the integral data I of the integral image P2. The memory capacity of the buffer memory 14R corresponds to the number of pieces of the integral data I of the integral image P2. In other words, the memory capacity of the buffer memory 14R is equivalent to the total value of the memory capacity of the buffer memory 14A and the memory capacity of the buffer memory 14B according to the present embodiment. Then, the buffer memory 14R outputs the integral data I at coordinates corresponding to a read address ADR that is supplied from the database 17R on the basis of the read address ADR. The database 17R stores a plurality of parameter sets PS each including the read address ADR, the calculation parameter PAR, the threshold FVth, and the coefficient K.

In the image recognition unit 1R according to the comparative example 1, the writing section 13R writes the integral data I of the integral image P2 to the buffer memory 14R. In other words, the buffer memory 14R stores all pieces of the integral data I of the integral image P2. Accordingly, the buffer memory 14R sequentially outputs the integral data I when outputting the plurality of pieces of the integral data I on the basis of the read address ADR. In other words, for example, in the example of FIG. 6, six cycles may be necessary for reading of six pieces of integral data I. As a result, the image recognition unit 1R may take a long time for read access. In particular, as with the image recognition unit 1, the image recognition unit 1R performs the read access on the basis of each of the plurality of parameter sets PS to perform the image recognition operation on one image P1. This increases the number of times of the read access. Therefore, the time necessary for the image recognition operation may become long.

In contrast, the image recognition unit 1 according to the present embodiment includes the two buffer memories 14A and 14B, and the writing section 13 selectively writes the integral data I to the buffer memories 14A and 14B. This allows the buffer memory 14A to output the integral data I on the basis of the read address ADA and the buffer memory 14B to output the integral data I on the basis of the read address ADB. Accordingly, for example, in the example of FIG. 6, three cycles are enough to read the six pieces of integral data I. This allows the image recognition unit 1 to perform read access to both of the buffer memories 14A and 14B, thereby increasing the processing speed.

Comparative Example 2

FIG. 12 illustrates a configuration example of an image recognition unit 1S according to a comparative example 2. The image recognition unit 1S includes a writing section 13S, six buffer memories 14S, and a database 17S. The writing section 13S writes the integral data I of the integral image P2 to the six buffer memories 14S. Each of the buffer memories 14S stores the integral data I of the integral image P2. In other words, the buffer memories 14S stores the data same as one another. The memory capacity of each of the buffer memories 14S corresponds to the data amount of the integral image P2. In addition, the six buffer memories 14S respectively output the integral data I at respective coordinates corresponding to six read addresses ADS that are supplied from the database 17S on the basis of the six read addresses ADS. The database 17S stores a plurality of parameter sets PS each including the six read addresses ADS, the calculation parameter PAR, the threshold value FVth, and the coefficient K.

In the image recognition unit 1S according to the comparative example 2, the writing section 13S writes the integral data I of the integral image P2 to the six buffer memories 14S. Then, the six buffer memories 14S respectively output the integral data on the basis of the six read addresses ADS. In other words, for example, in the example of FIG. 6, six pieces of integral data I may be read in one cycle. Such parallel processing makes it possible to reduce the time for the read access in the image recognition unit 1S. In this example, however, it is necessary to include the six buffer memories 14S, which increases the mounting area of the buffer memories 14S and may accordingly increase its cost.

In contrast, in the image recognition unit 1 according to the present embodiment, the buffer memory 14A stores the integral data I having an odd x-coordinate and the buffer memory 14B stores the integral data I having an even x-coordinate, out of the integral data I of the integral image P2 in this example. In other words, the buffer memories 14A and 14B store data different from each other. This makes it possible to reduce the time for the read access while reducing the memory capacities of the buffer memories 14A and 14B in the image recognition unit 1.

[Effects]

As mentioned above, since the integral data are selectively written to the two buffer memories in the present embodiment, it is possible to increase the processing speed.

In the present embodiment, the reading addresses are so set as to prevent the read access from concentrating on one of the buffer memories, which makes it possible to increase the processing speed.

[Modification 1]

As illustrated in FIG. 4, in the present embodiment, the writing pattern in which the coordinates of the integral data I to be written to the buffer memory 14A (the white part) and the coordinates of the integral data I to be written to the buffer memory 14B (the hatched part) are alternately arranged one by one in columns is used; however, the writing pattern is not limited thereto. For example, as illustrated in FIG. 13, a writing pattern in which the coordinates of the integral data I to be written to the buffer memory 14A (the white part) and the coordinates of the integral data I to be written to the buffer memory 14B (the hatched part) are alternately arranged one by one in rows may be used. Further, for example, as illustrated in FIG. 14, a writing pattern in which the coordinates of the integral data I to be written to the buffer memory 14A (the white part) and the coordinates of the integral data I to be written to the buffer memory 14B (the hatched part) are alternately arranged in a checkered pattern may be used. Furthermore, for example, as illustrated in FIG. 15, a writing pattern in which the coordinates of the integral data I to be written to the buffer memory 14A (the white part) and the coordinates of the integral data I to be written to the buffer memory 14B (the hatched part) are alternately arranged two by two in columns in the integral image P2 may be used.

Further, the writing section 13 writes the integral data I to the two buffer memories 14A and 14B with one writing pattern; however, the writing pattern is not limited thereto. For example, a plurality of writing patterns as illustrated in FIG. 4 and FIGS. 13 to 15 may be prepared, and a writing pattern to be used may be selected. This allows for use of a writing pattern appropriate to, for example, the recognition object.

[Modification 2]

Although two buffer memories 14A and 14B are provided in the above-described embodiment, the buffer memory is not limited thereto. The present modification is described in detail below with use of some examples.

FIG. 16 illustrates a configuration example of an image recognition unit 2 according to the present modification. The image recognition unit 2 includes a writing section 43, three buffer memories 44A, three buffer memories 44B, and a database 47.

The writing section 43 selectively write the integral data I of the integral image P2 to the three buffer memories 44A and the three buffer memories 44B. More specifically, the writing section 43 writes the integral data I having an odd x-coordinate to the three buffer memories 44A and writes the integral data I having an even x-coordinate to the three buffer memories 44B, out of the integral data I of the integral image P2, as with the writing section 13 according to the above-described embodiment.

Each of the buffer memories 44A stores the integral data I having an odd x-coordinate out of the integral data I of the integral image P2, and each of the buffer memories 44B stores the integral data I having an even x-coordinate out of the integral data I of the integral image P2. In other words, the buffer memories 44A store the same data as one another, and the buffer memories 44B store the same data as one another. The memory capacity of each of the buffer memories 44A and 44B corresponds to a half of the number of pieces of the integral data I of the integral image P2. The three buffer memories 44A respectively output the integral data I at respective coordinates corresponding to three read addresses ADA2 that are supplied from the database 47 on the basis of the read addresses ADA2. The three buffer memories 44B respectively output the integral data I at respective coordinates corresponding to three read addresses ADB2 that are supplied from the database 47 on the basis of the read addresses ADB2.

The database 47 stores the plurality of parameter sets PS each including the three read addresses ADA2, the three read addresses ADB2, the calculation parameter PAR, the threshold FVth, and the coefficient K.

This configuration causes the writing section 43 to selectively write the integral data I of the integral image P2 to the three buffer memories 44A and the three buffer memories 44B in the image recognition unit 2. Then, the three buffer memories 44A respectively output the integral data I on the basis of the three read addresses ADA2, and the three buffer memories 44B respectively output the integral data I on the basis of the three read addresses ADB2. This makes it possible to read the six pieces of integral data I in one cycle, for example, in the example of FIG. 6. As mentioned above, in the image recognition unit 2 performing the parallel processing makes it possible to reduce the time for read access while reducing the memory capacities of the buffer memories 44A and 44B.

FIG. 17 illustrates a configuration example of another image recognition unit 3 according to the present modification. The image recognition unit 3 includes a writing section 53, two buffer memories 54A, two buffer memories 54B, two buffer memories 54C, two buffer memories 54D, and a database 57.

The writing section 54 selectively writes the integral data I of the integral image P2 to the two buffer memories 54A, the two buffer memories 54B, the two buffer memories 54C, and the two buffer memories 54D.

FIG. 18 illustrates an operation example of the writing section 53. The writing pattern of the writing section 53 is formed by repeating a unit pattern UP that corresponds to four coordinates of two rows by two columns. For example, the writing section 53 may write the integral data I at upper left coordinates of the unit pattern UP to the two buffer memories 54A, write the integral data I at upper right coordinates to the two buffer memories 54B, write the integral data I at lower left coordinates to the two buffer memories 54C, and write the integral data I at lower right coordinates to the two buffer memories 54D. As mentioned above, the writing section 53 writes the integral data I of the integral image P2 to the two buffer memories 54A, the two buffer memories 54B, the two buffer memories 54C, and the two buffer memories 54D with the writing pattern as illustrated in FIG. 18.

Each of the buffer memories 54A stores the integral data I at the upper left coordinates of the unit pattern UP, each of the buffer memories 54B stores the integral data I at the upper right coordinates of the unit pattern UP, each of the buffer memories 54C stores the integral data I at the lower left coordinates of the unit pattern UP, and each of the buffer memories 54D stores the integral data I at the lower right coordinates of the unit pattern UP. In other words, the buffer memories 54A store the same data as each other, the buffer memories 54B store the same data as each other, the buffer memories 54C store the same data as each other, and the buffer memories 54D store the same data as each other. The memory capacity of each of the buffer memories 54A, 54B, 54C, and 54D corresponds to a quarter of the number of pieces of the integral data I of the integral image P2. The two buffer memories 54A respectively output the integral data I at the respective coordinates corresponding to two read addresses ADA3 that are supplied from the database 57 on the basis of the read addresses ADA3. Likewise, the two buffer memories 54B respectively output the integral data I on the basis of two read addresses ADB3. The two buffer memories 54C respectively output the integral data I on the basis of two read addresses ADC3. The two buffer memories 54D respectively output the integral data I on the basis of two read addresses ADD3.

The database 57 stores the plurality of parameter sets PS each including the two read addresses ADA3, the two read addresses ADB3, the two read addresses ADC3, the two read addresses ADD3, the calculation parameter PAR, the threshold FVth, and the coefficient K.

This configuration allows the image recognition unit 3 to read a maximum of eight pieces of integral data I in one cycle. As mentioned above, in the image recognition unit 3, performing the parallel processing makes it possible to reduce the time for read access while reducing the memory capacities of the buffer memories 54A, 54B, 54C, and 54D.

2. Application Example

Next, an application example of the image recognition unit described in any of the embodiment and the modifications described above is described.

FIGS. 19A and 19B are diagrams each illustrating an appearance of a digital camera to which the image recognition unit according to any of the embodiment and the modifications is applied, where FIG. 19A illustrates an appearance of the digital camera as viewed from front side (object side) thereof, and FIG. 19B illustrates an appearance of the digital camera as viewed from rear side (image side) thereof. The digital camera may include, for example, a light emitting section 410 for flash, a display section 420, a menu switch 430, and a shutter button 440. The digital camera includes an image recognition unit that recognizes a human face.

The image recognition unit according to any of the above-described embodiment and the modifications is applicable to electronic apparatuses in various fields, such as a television, a smartphone, and a game machine, in addition to such a digital camera. In other words, the image recognition unit according to any of the above-described embodiment and the modifications may be applied to electronic apparatuses that process an image in every field, and contributes to improvement of the processing speed in the electronic apparatuses.

Hereinbefore, although the technology has been described with referring to the embodiment, the modifications, and the application examples to the electronic apparatuses, the technology is not limited thereto, and various modifications may be made.

For example, although the recognition object of the image recognition unit is a human face in the above-described embodiment and examples, the recognition object is not limited thereto, and various objects such as a human, an animal, and a body are used as the recognition object.

Moreover, for example, although the buffer memories 14A and 14B store the integral image P2 in the above-described embodiment and examples, the image stored by the buffer memories 14a and 14B is not limited thereto, and the buffer memories 14A and 14B may alternatively store, for example, the image P1 itself. In this case, for example, the feature amount calculation section may read the luminance data P at all of the coordinates in the plurality of rectangular regions of the image P1, and calculate the feature amount FV based on the read luminance data P.

Note that the effects described in the present specification are illustrative and non-limiting. Effects achieved by the technology may be effects other than those described above.

Note that the technology may be configured as follows.

(1) An image recognition unit, including:
a plurality of memory sections;
a writing section that selectively writes a plurality of pieces of pixel data of a data map to the plurality of memory sections; and
an arithmetic section that reads a plurality of pixel data sets from the plurality of memory sections, and determines whether an input image corresponding to the data map includes a recognition object, on a basis of the plurality of pixel data sets, the pixel data sets each including a predetermined number of pieces of pixel data.

(2) The image recognition unit according to (1), wherein the predetermined number of pieces of pixel data are pixel data at coordinates corresponding to four corners of each of a plurality of rectangular regions in the data map.

(3) The image recognition unit according to (2), wherein the writing section selectively writes the pixel data to the plurality of memory sections, on a basis of a writing pattern, the writing pattern indicating association between each coordinate of the data map and the memory section to which the pixel data at the coordinate is to be written, out of the plurality of memory sections.

(4) The image recognition unit according to (3), wherein
the writing pattern comprises a plurality of writing patterns, and
the writing section selectively writes the pixel data to the plurality of memory sections, on a basis of one of the plurality of writing patterns.

(5) The image recognition unit according to (3) or (4), wherein, in the writing pattern, each coordinate is associated with the memory section to which the pixel data at the coordinate is to be written, to prevent read access when the arithmetic section reads the predetermined number of pieces of pixel data, from concentrating on one memory section.

(6) The image recognition unit according to (5), wherein, in the writing pattern, each coordinate is associated with the memory section to which the pixel data at the coordinate is to be written, to make the number of times of the read access to the plurality of memory sections equal to one another.

(7) The image recognition unit according to any one of (3) to (6), wherein, in the writing pattern, two coordinates adjacent in a first direction or a second direction or both directions in the data map are associated with the memory sections different from each other.

(8) The image recognition unit according to any one of (2) to (7), further including a data map generation section, wherein
the input image includes a plurality of pieces of luminance data, and
the data map generation section sequentially selects a first coordinate in the input image, and generates pixel data at the first coordinate of the data map on the basis of a sum of values of the luminance data within an image range that has, as diagonal coordinates, the first coordinate and a second coordinate, the second coordinate corresponding to one of the four corners of the input image.

(9) The image recognition unit according to (8), wherein the arithmetic section includes a score generation section and a determination section, the score generation section determining a plurality of scores based on the respective pixel data sets, and the determination section determining whether the input image corresponding to the data map includes a recognition object, on a basis of the scores.

(10) The image recognition unit according to (9), wherein
the plurality of rectangular regions include one or a plurality of first rectangular regions and one or a plurality of second rectangular regions,
the score generation section determines a first total value and a second total value, compares a difference between the first total value and the second total value with a first threshold, and determines the score on a basis of a comparison result, the first total value indicating a sum of values of the luminance data in the one or the plurality of first rectangular regions, and the second total value indicating a sum of values of the luminance data in the one or the plurality of second rectangular regions.

(11) The image recognition unit according to (10), wherein the score generation section weights the comparison result to determine the score.

(12) The image recognition unit according to (9) or (10), wherein the determination section adds the scores, and compares an addition result with a second threshold to determine whether the input image includes the recognition object.

(13) The image recognition unit according to any one of (1) to (12), wherein
each of the memory sections includes a plurality of individual memory sections that store pixel data same as one another, and
the arithmetic section reads, from the plurality of individual memory sections, pixel data different from one another out of the predetermined number of pieces of pixel data.

(14) The image recognition unit according to any one of (1) to (13), further including an input image generation section that sequentially selects a portion of a frame image to generate the input image.

(15) The image recognition unit according to any one of (1) to (14), wherein the recognition object is a face.

(16) A learning method of an image recognition unit, including:
generating a data map including a plurality of pieces of pixel data, on a basis of a learning image;
preparing a writing pattern that indicates association between each coordinate of the data map and a memory section writing the pixel data at the coordinate out of a plurality of memory sections;
setting coordinates of a predetermined number of pieces of pixel data in the data map to prevent read access from concentrating on one memory section when the predetermined number of pieces of pixel data are read from the plurality of memory sections;
acquiring the predetermined number of pieces of pixel data from the data map to determine whether the learning image includes a recognition object, on a basis of the acquired pixel data; and
determining whether to use the coordinates of the predetermined number of pieces of pixel data for image recognition processing, on a basis of a determination result.

(17) An electronic apparatus provided with an image recognition unit and a processing section that performs predetermined processing on a basis of a processing result of the image recognition unit, the image recognition unit including:
a plurality of memory sections;
a writing section that selectively writes a plurality of pieces of pixel data of a data map to the plurality of memory sections; and
an arithmetic section that reads a plurality of pixel data sets from the plurality of memory sections, and determines whether an input image corresponding to the data map includes a recognition object, on a basis of the plurality of pixel data sets, the pixel data sets each including a predetermined number of pieces of pixel data.

This application is based upon and claims the benefit of priority of the Japanese Patent Application No. 2014-160215 filed in the Japan Patent Office on Aug. 6, 2014, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An image recognition device, comprising:
a plurality of buffer memories; and
circuitry configured to:
selectively write a plurality of pieces of pixel data of a data map to the plurality of buffer memories, based on a writing pattern;
read a plurality of pixel data sets from the plurality of buffer memories; and
determine an input image corresponding to the data map includes an object, based on the plurality of pixel data sets,
wherein each pixel data set of the plurality of pixel data sets includes a number of pieces of the pixel data, and
wherein the writing pattern indicates an association between each coordinate of the data map and a corresponding buffer memory of the plurality of buffer memories to which the pixel data at corresponding coordinate is written, to prevent read access to concentrate on one buffer memory when the number of pieces of the pixel data are read.

2. The image recognition device according to claim 1, wherein the number of pieces of the pixel data are respective pixel data at coordinates corresponding to four corners of each region of a plurality of rectangular regions in the data map.

3. The image recognition device according to claim 2, wherein the circuitry is further configured to selectively write the respective pixel data to the plurality of buffer memories based on a writing pattern.

4. The image recognition device according to claim 3,
wherein the writing pattern comprises a plurality of writing patterns, and
wherein the circuitry is further configured to selectively write the respective pixel data to the plurality of buffer memories based on one of the plurality of writing patterns.

5. The image recognition device according to claim 1, wherein, in the writing pattern, each coordinate is associated with the corresponding buffer memory to which the pixel data at the corresponding coordinate is written, such that a number of times of the read access to each buffer memory of the plurality of buffer memories are equal.

6. The image recognition device according to claim 3,
wherein, in the writing pattern, a first coordinate adjacent to a second coordinate in at least one of a first direction in the data map, or a second direction in the data map,
wherein the first coordinate is associated with a first buffer memory of the plurality of buffer memories and the second coordinate is associated with a second buffer memory of the plurality of buffer memories.

7. The image recognition device according to claim 2, wherein the input image includes a plurality of pieces of luminance data, and the circuitry is further configured to:
select a first coordinate in the input image; and
generate first pixel data at the first coordinate of the data map based on a sum of values of the luminance data within an image range that has, as diagonal coordinates, the first coordinate and a second coordinate, wherein the second coordinate corresponds to one of the four corners.

8. The image recognition device according to claim 7, wherein the circuitry is further configured to:
determine a plurality of scores based on respective pixel data sets; and determine the input image corresponding to the data map includes the object, based on the plurality of scores.

9. The image recognition device according to claim 8, wherein the plurality of rectangular regions include at least one of a plurality of first rectangular regions and at least one of a plurality of second rectangular regions, and
wherein the circuitry is further configured to:
determine a first total value and a second total value;
compare a difference between the first total value and the second total value with a first threshold value; and
determine a score based on a comparison result obtained from the comparison, wherein the first total value indicates a first sum of values of the luminance data in the at least one of the plurality of first rectangular regions, and the second total value indicates a second sum of values of the luminance data in the at least one of the plurality of second rectangular regions.

10. The image recognition device according to claim 9, wherein the circuitry is further configured to weight the comparison result to determine the score.

11. The image recognition device according to claim 8, wherein the circuitry is further configured to:
add the plurality of scores to obtain an addition result; and
compare the addition result with a second threshold value to determine the input image includes the object.

12. The image recognition device according to claim 1, wherein each buffer memory of the plurality of buffer memories includes a plurality of individual buffer memories,
wherein the plurality of individual buffer memories store same pixel data, and
wherein the circuitry is further configured to read, from the plurality of individual buffer memories, first pixel data and second pixel data different from the first pixel data out of the number of pieces of the pixel data.

13. The image recognition device according to claim 1, wherein the circuitry is further configured to sequentially select a portion of a frame image to generate the input image.

14. The image recognition device according to claim 1, wherein the object is a face.

15. A method, comprising:
generating a data map including a plurality of pieces of pixel data based on an image;
preparing a writing pattern that indicates association between each coordinate of the data map and a buffer memory of a plurality of buffer memories writing the pixel data at a coordinate;
setting coordinates of a number of pieces of the pixel data in the data map to prevent read access from concentrating on one buffer memory when the number of pieces of the pixel data are read from the plurality of buffer memories;
acquiring the number of pieces of the pixel data from the data map;
determining the image includes an object, based on the acquired pixel data; and
determining whether to use the coordinates of the number of pieces of the pixel data for image recognition processing, based on the determination that the image includes the object.

16. An electronic apparatus with an image recognition device and a processor, wherein the processor is configured to process based on processing result of the image recognition device, wherein the image recognition device comprises:
a plurality of buffer memories; and
circuitry, wherein the circuitry is further configured to:
selectively write a plurality of pieces of pixel data of a data map to the plurality of buffer memories, based on a writing pattern; and
read a plurality of pixel data sets from the plurality of buffer memories; and
determine, an input image corresponding to the data map includes an object, based on the plurality of pixel data sets,
wherein each pixel data set of the plurality of pixel data sets includes a number of pieces of the pixel data, and
wherein the writing pattern indicates an association between each coordinate of the data map and a corresponding buffer memory of the plurality of buffer memories to which the pixel data at corresponding coordinate is written, to prevent read access to concentrate on one buffer memory when the number of pieces of the pixel data are read.

* * * * *